United States Patent
Briggs et al.

(10) Patent No.: US 12,209,537 B1
(45) Date of Patent: Jan. 28, 2025

(54) HYDRAULIC MOTORING OF ENGINE

(71) Applicant: Hamilton Sundstrand Corporation, Charlotte, NC (US)

(72) Inventors: Eric Briggs, Indian Trail, NC (US); Naison E. Mastrocola, Goshen, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/226,163

(22) Filed: Jul. 25, 2023

(51) Int. Cl.
*F02C 7/232* (2006.01)
*F02C 7/27* (2006.01)
*F02C 9/26* (2006.01)

(52) U.S. Cl.
CPC ............... *F02C 7/232* (2013.01); *F02C 7/27* (2013.01); *F02C 9/263* (2013.01); *F05D 2270/62* (2013.01)

(58) Field of Classification Search
CPC .... F02C 7/22; F02C 7/27; F02C 7/275; F02C 7/277; F02C 7/262; F02C 7/268; F02C 7/232; F02C 7/236; F02C 7/36; F02C 9/28; F02C 9/44; F02C 9/48; F02C 9/56; F01D 15/08; F01D 19/00
See application file for complete search history.

(56) References Cited

U.S. PATENT DOCUMENTS

| | | | |
|---|---|---|---|
| 5,722,228 A | 3/1998 | Lampe et al. | |
| 5,735,116 A * | 4/1998 | Mouton | F02C 7/268 |
| | | | 60/788 |
| 5,845,483 A * | 12/1998 | Petrowicz | F02C 7/262 |
| | | | 60/788 |
| 2006/0272313 A1 | 12/2006 | Eick et al. | |
| 2016/0076452 A1 * | 3/2016 | Striker | F02C 7/224 |
| | | | 60/734 |
| 2018/0298777 A1 * | 10/2018 | Nguyen | F02C 7/36 |
| 2020/0088103 A1 * | 3/2020 | Ajami | F02C 7/32 |
| 2020/0191058 A1 * | 6/2020 | Turney | F02C 7/236 |
| 2021/0025331 A1 | 1/2021 | Yates et al. | |

FOREIGN PATENT DOCUMENTS

FR    3099207 B1    7/2021

OTHER PUBLICATIONS

Extended European Search Report dated Nov. 29, 2024, for corresponding European Patent Application No. 24190981.1, 8, pgs.

* cited by examiner

*Primary Examiner* — Alain Chau
(74) *Attorney, Agent, or Firm* — Kinney & Lange, P.A.

(57) ABSTRACT

In accordance with at least one aspect of this disclosure, a system includes a fuel line, an electrically driven fuel pump configured to supply fuel to a first fuel line branch and a second fuel line branch, and a selector valve disposed in the fuel line at a juncture of a first fuel line branch and a second fuel line branch configured to communicate the electrically driven fuel pump with the first fuel line branch or the second fuel line branch based on a position of the selector valve. In a first position, the selector valve is configured to fluidly connect the electrically driven fuel pump with the first fuel line branch to supply fuel to a combustor of the engine and drive a high pressure shaft at a first speed. In a second position, the selector valve is configured to fluidly connect the electrically driven fuel pump with the second fuel line branch to drive a hydraulic rotation unit configured to drive the high pressure spool of the engine at a second speed different from the first speed.

12 Claims, 2 Drawing Sheets

HYDRAULIC MOTORING OF ENGINE

TECHNICAL FIELD

The present disclosure relates to engines and more particularly to hydraulic motoring of engines.

BACKGROUND

In certain conditions, e.g., when an engine is stationary after being operated at high temperature, convection currents can cause unequal temperatures throughout the cross section of the engine core. Typically, motoring the engine with the air turbine starter is used to rotate engine, drive airflow, and equalize radial temperatures.

The conventional techniques have been considered satisfactory for their intended purpose. However, there is an ever present need for improved systems and methods for motoring the engine without using the air turbine starter. This disclosure provides a solution for this need.

SUMMARY

In accordance with at least one aspect of this disclosure, a system includes a fuel line, an electrically driven fuel pump configured to supply fuel to a first fuel line branch and a second fuel line branch, and a selector valve disposed in the fuel line at a juncture of a first fuel line branch and a second fuel line branch configured to communicate the electrically driven fuel pump with the first fuel line branch or the second fuel line branch based on a position of the selector valve. In a first position, the selector valve is configured to fluidly connect the electrically driven fuel pump with the first fuel line branch to supply fuel to a combustor of the engine and drive a high pressure shaft at a first speed. In a second position, the selector valve is configured to fluidly connect the electrically driven fuel pump with the second fuel line branch to drive a hydraulic rotation unit configured to drive the high pressure spool of the engine at a second speed different from the first speed.

In certain embodiments, the first speed can be faster than the second speed. In certain embodiments, the electrically driven fuel pump can be an electrically driven main fuel pump, an electrically driven start up pump, or an electrically driven cruise pump. In embodiments, an electrically controlled actuator can be operatively connected to the selector valve configured to move the selector valve between the first position and the second position. In certain embodiments, the electrically controlled actuator can be or include a solenoid actuator. In certain embodiments, the electrically controlled actuator can be actively controlled by an engine controller based at least in part on a state of the engine.

In embodiments, the hydraulic rotation unit can include a shaft mechanically connected to the high pressure shaft through a gearbox and a disconnect mechanism configured to disconnect the shaft from the high pressure shaft when the selector valve is in the first state. A fuel metering system can be disposed in the first fuel line branch downstream of the selector valve configured to meter fuel in the first fuel line branch upstream of the combustor. A fuel-oil manifold can be disposed in the first fuel line branch downstream of the selector valve and upstream of the combustor configured to supply fuel to the combustor. In embodiments, a recirculating fuel line can fluidly connect the fuel-oil manifold and the electrically driven fuel pump such that the electrically driven fuel pump can be supplied at least in part by the fuel-oil manifold.

In embodiments, the electrically controlled actuator can be actively controlled by an engine controller and the engine controller can be configured to control the electrically controlled actuator to move the selector valve between the first position and the second position based on a flight phase of an aircraft having the engine.

In embodiments, the system can include the aircraft having the engine, and the controller can be configured to actuator the to place the selector valve in the first position during one or more of, take off, cruise, and/or descent. The controller can be configured to actuator the to place the selector valve in the second position when the aircraft is on-ground after landing and after taxi.

In accordance with at least one aspect of this disclosure, a method can include toggling a selector valve between a first state and a second state to drive a high pressure spool of a dual spool engine at a first speed or a second speed based on a state of the selector valve. The first speed can be higher than the second speed. The state of the selector valve can be based at least in part on a condition of the engine.

In embodiments, the method can further include driving an electrically driven fuel pump to supply fuel to the selector valve and toggling the selector valve to the first state can include communicating the electrically driven fuel pump with a fuel manifold and a combustor of the dual spool engine through the selector valve to drive the high pressure spool at the first speed. In embodiments, the method can include metering the fuel with a fuel metering system downstream of the selector valve and upstream of the fuel manifold and combustor.

In embodiments, the method can further include driving the electrically driven fuel pump to supply fuel to the selector valve and toggling the selector valve to the second state can include communicating the electrically driven fuel pump with a hydraulic rotation unit through the selector valve to drive the high pressure spool at the second speed. In embodiments, the method can further include driving the high pressure spool with a shaft of the hydraulic rotation unit through a gearbox. In certain embodiments, driving the high pressure spool at the second speed can further include circulating air through the dual spool engine while no combustion occurs in a combustor of the dual spool engine to uniformly cool the engine in a circumferential direction.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, other embodiments thereof will be described in detail herein below with reference to certain figures, wherein.

DETAILED DESCRIPTION

Figure 1:
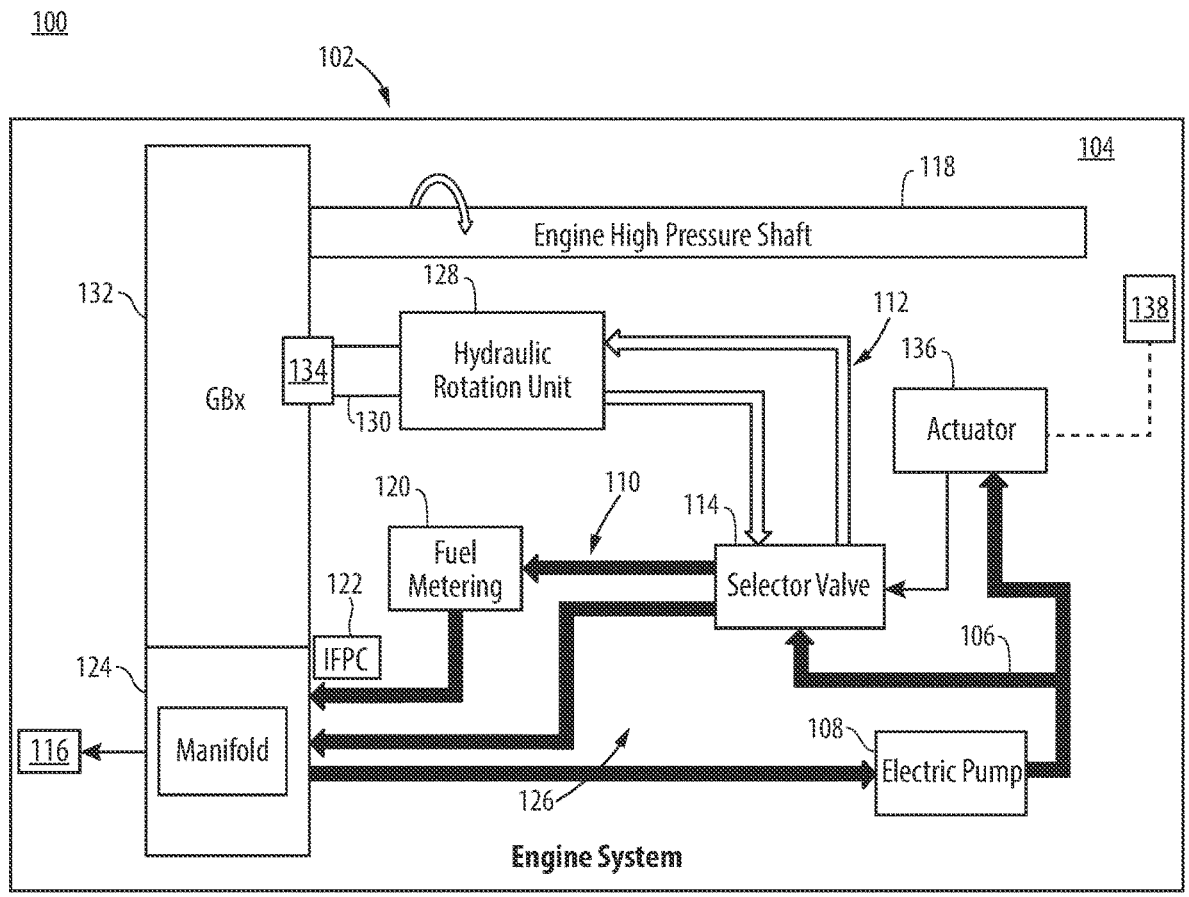
FIG. 1 is a schematic diagram of an embodiment of a system in accordance with this disclosure, showing an engine having a selector valve in a first state.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIG. 2

Figure 2:
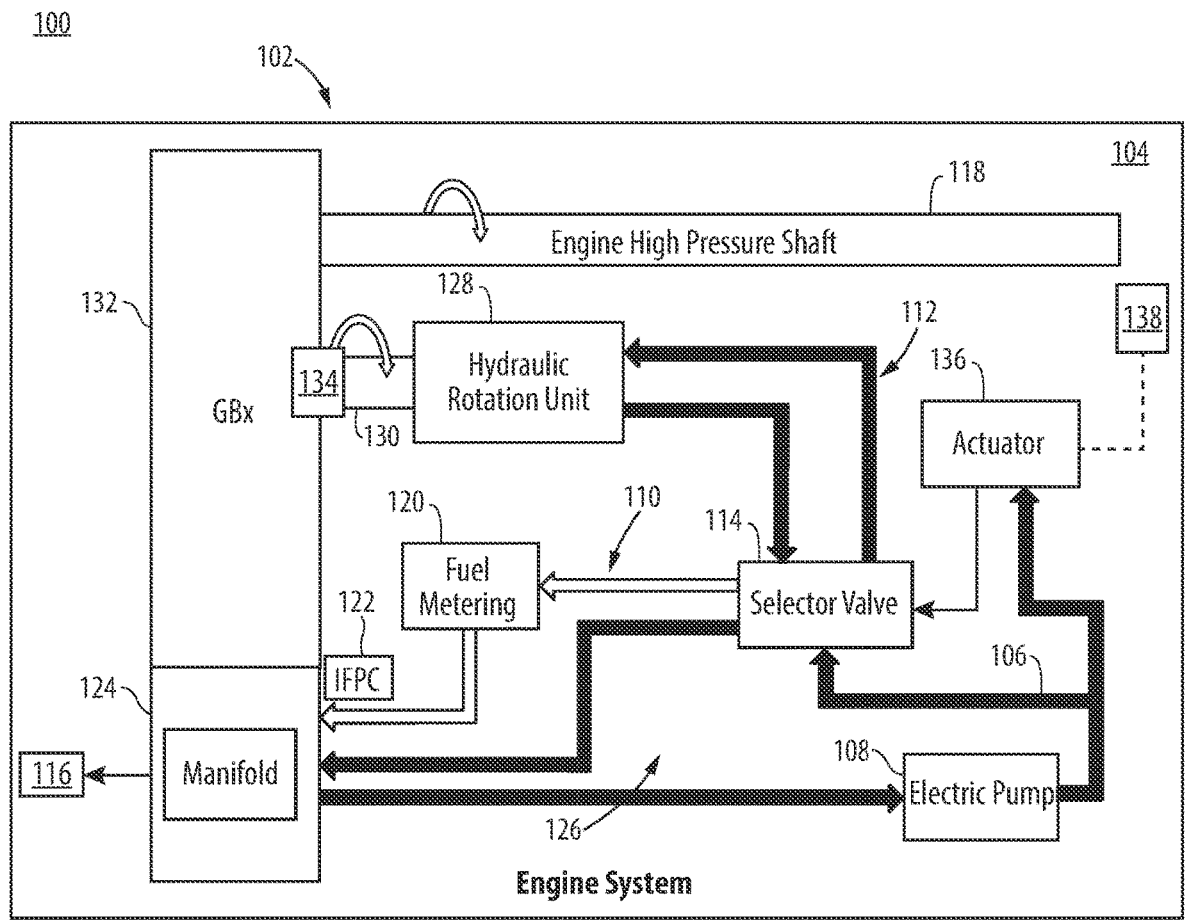
FIG. 2 is schematic diagram showing the engine of FIG. 1 where the selector valve is in a second state.

In accordance with at least one aspect of this disclosure, as shown in FIGS. 1 and 2, a system 100 can include an aircraft 102 having an engine 104 (e.g., a dual spool engine though engine 104 shows only one spool for clarity). The system can include a fuel line 106, an electrically driven fuel pump 108 configured to supply fuel to a first fuel line branch 110 of the fuel line 106 and a second fuel line branch 112 of the fuel line 106. A selector valve 114 can be disposed in the fuel line 106 at a juncture of the first fuel line branch 110 and the second fuel line branch 112. The selector valve 114 can be configured to fluidly connect the electrically driven fuel pump 108 with either the first fuel line branch 110 or the second fuel line branch 112 based on a position of the selector valve 114.

In a first position of the selector valve 114, as shown in FIG. 1, the selector valve 114 can be configured to fluidly connect the electrically driven fuel pump 108 with the first fuel line branch 110 to supply fuel to a combustor 116 of the engine 104 and drive a high pressure shaft 118 of the engine 104 at a first speed. A fuel metering system 120 can be disposed in the first fuel line branch 110 downstream of the selector valve 114 configured to meter fuel in the first fuel line branch upstream of the combustor 116. In embodiments, the fuel metering system can include an integrated fuel pump and control (IFPC) unit 122. In certain embodiments, the IFPC 122 can include any suitable number of pumps, valves, fuel metering devices, and the like to control fuel pumping and modulation in the first fuel line branch as it is pumped to the combustor 116. The IFPC can be controlled by controller (e.g., controller 138 or a main engine controller). A fuel-oil manifold 124 can be disposed in the first fuel line branch 110 downstream of the selector valve 114 and upstream of the combustor 116 configured to supply the metered fuel to the combustor 116.

In embodiments, a recirculating fuel line 126 can fluidly connect the fuel-oil manifold 124 and the electrically driven fuel pump 108 such that the electrically driven fuel pump 108 can be supplied at least in part by the fuel-oil manifold 124. In embodiments, the fuel line 126 can include both a hydraulic supply to the electric pump 108 and hydraulic return from selector valve 114, and the manifold 124 can contains a filter or cooler between return and supply. In embodiments, the recirculating line 126 can also serve as a low pressure fuel return for high pressure sources.

In a second position of the selector valve, e.g., as shown in FIG. 2, the selector valve 114 can be configured to fluidly connect the electrically driven fuel pump 108 with the second fuel line branch 112 to drive a hydraulic rotation unit 128 configured to drive the high pressure shaft 118 of the engine 104 at a second speed different from the first speed. In embodiments, the hydraulic rotation unit 128 can include a shaft 130 mechanically connected to the high pressure shaft 118 through a gearbox 132. the hydraulic rotation unit 128 further comprises a disconnect mechanism 134 configured to disconnect the shaft 130 from the high pressure shaft 118 when the selector valve is in the first position. In embodiments, the disconnect mechanism 134 can be or include an electromechanical clutch, a one-way clutch (e.g., similar to an air turbine starter system), a hydraulic clutch, or a hydraulic isolation.

In embodiments, the hydraulic rotation unit 128 can operate under a similar mechanism as the electrically driven pump 108. For example, in embodiments, if the electrically driven pump 108 is a positive displacement pump, the hydraulic rotation unit 128 can be or include a piston hydraulic motor. As another example, if the electrically driven fuel pump 108 is a centrifugal pump, the hydraulic rotation unit 128 can be or include a hydraulic turbine. In certain embodiments, the electrically driven fuel pump 108 can be an electrically driven main fuel pump, an electrically driven start up pump, an electrically driven cruise pump or any suitable electrically driven fuel pump as appreciated by one having ordinary skill in the art in view of this disclosure. The hydraulic rotation unit 128 can be or include any suitable components as needed to be compatible with the chosen electrically driven fuel pump 108.

The system 100 can be configured to rotate the high pressure shaft 118 at the first speed when the selector valve 114 is in the first position and rotate the high pressure shaft 118 at the second speed when the selector valve 114 is in the second position. In embodiments, the first speed can be faster than the second speed. In embodiments, an electrically controlled actuator 136 can be operatively connected to the selector valve 114 configured to move the selector valve 114 between the first position and the second position. In certain embodiments, the electrically controlled actuator 136 can be or include a solenoid actuator where in a de-energized state, the solenoid actuator places the selector valve 114 in the first position, and in an energized state, the solenoid actuator places the selector valve 114 in the second position. In certain embodiments, the electrically controlled actuator 136 can be actively controlled by an engine controller 138 (e.g., an electronic engine controller or FADEC) based at least in part on a state of the engine 104. The controller 138 can be the same controller configured to control the IFPC, in embodiments.

The condition of the engine can be an operating condition of the engine 104, such as during normal operation or shut down. The controller 138 can be configured maintain the actuator 136 in the de-energized state to keep the selector valve 114 in the first position during a normal operation of the engine 104, where the high pressure shaft 118 rotates at an operating speed. The controller 138 can be configured to control the actuator 136 to energize to move the selector valve 114 to the first position when the engine 104 is shut down but the electric pump 108 is still operating. In this state, the high pressure shaft 118 rotates at a slow motoring speed, slower than the operating speed, to continue to circulate air in the engine to uniformly cool the engine 104 in the circumferential direction (e.g., by equalizing radial temperatures).

In certain embodiments, the controller 138 can be configured to control the electrically controlled actuator 136 to move the selector valve 114 between the first position and the second position based on a flight phase of the aircraft 102. For example, the controller 138 can be configured to control the actuator 136 the to hold the selector valve 114 in the first position during one or more of, take off, cruise, and/or descent. The controller 138 can be configured to energize actuator 136 the to place the selector valve 114 in the second position when the aircraft is on-ground after landing and after taxi or when the aircraft 102 is at a gate and the engines 104 have been shut down.

In certain embodiments, the selector valve be actively controlled by altering control pressure references, for example, the selector valve can include hydraulic porting elements, and the solenoid can provide an electrical interface for control pressures. An example of such a architecture can include a spool valve with a solenoid, a single stage servo valve, or electro-hydraulic servo valve, for example. In certain embodiments, the electrical interface could also be integrated into the valve assembly through the use of an electromechanical actuator.

In accordance with at least one aspect of this disclosure, a method can include toggling a selector valve (e.g., selector valve 114) between a first state and a second state to drive a high pressure spool (e.g., shaft 118) of a dual spool engine (e.g., engine 104) at a first speed or a second speed based on a state of the selector valve. The first speed can be higher than the second speed. The state of the selector valve can be based at least in part on a condition of the engine (e.g., operating condition).

In embodiments, the method can further include driving an electrically driven fuel pump (e.g., pump 108) to supply fuel to the selector valve and toggling the selector valve to the first state can include fluidly connecting the electrically driven fuel pump with a fuel manifold (e.g., manifold 124) and a combustor (e.g., combustor 116) of the dual spool engine through the selector valve to drive the high pressure spool at the first speed. In embodiments, the method can include metering the fuel with a fuel metering system (e.g., metering system 120) downstream of the selector valve and upstream of the fuel manifold and combustor.

In embodiments, the method can further include driving the electrically driven fuel pump to supply fuel to the selector valve and toggling the selector valve to the second state can include fluidly connecting the electrically driven fuel pump with a hydraulic rotation unit (e.g., rotation unit 128) through the selector valve to drive the high pressure spool at the second speed. In embodiments, the method can further include driving the high pressure spool with a shaft (e.g., shaft 130) of the hydraulic rotation unit through a gearbox (e.g., gearbox 132). In certain embodiments, driving the high pressure spool at the second speed can further include circulating air through the dual spool engine while no combustion occurs in the combustor of the dual spool engine to uniformly cool the engine in a circumferential direction.

Embodiments can include an electric pump (e.g., a start pump) which receives fuel from a fuel-oil manifold. The electric start pump can generate a flow or pressure using electrical power. A selector valve (e.g., a hydraulic motor selector valve can send pressurized fluid to either a fuel metering system (e.g., as shown in FIG. 1) or hydraulic rotation unit (e.g., as shown in FIG. 2). In embodiments, the hydraulic rotation unit can consist of a fueldraulic motor or turbine attached to a gear reduction (e.g., a gearbox assembly) to drive slow high pressure shaft (e.g., N2 shaft) rotation. In instances when motoring of the high pressure shaft is not required, the selector valve can send pressurized fuel to the fuel metering system. In embodiments, the selector valve can be controlled by a solenoid to enable engine controller (e.g., EEC) active command of the solenoid and selector valve. Embodiments of the system 100 described herein allow for motoring of the high pressure shaft without using the air turbine starter and without requiring a new additional electric pump to be added to the system, which can add additional weight to the system.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A system, comprising:
   a fuel line;
   an electrically driven fuel pump configured to supply fuel to a first fuel line branch and a second fuel line branch;
   a selector valve disposed in the fuel line at a juncture of the first fuel line branch and the second fuel line branch configured to fluidly connect the electrically driven fuel pump with the first fuel line branch or the second fuel line branch based on a position of the selector valve, wherein a first position, the selector valve is configured to fluidly connect the electrically driven fuel pump with the first fuel line branch to supply fuel to a combustor of an engine and drive a high pressure shaft at a first speed, wherein in a second position, the selector valve is configured to fluidly connect the electrically driven fuel pump with the second fuel line branch to drive a hydraulic rotation unit configured to drive the high pressure shaft of the engine at a second speed different from the first speed.

2. The system of claim 1, wherein the electrically driven fuel pump is an electrically driven main fuel pump, an electrically driven start up pump, or an electrically driven cruise pump.

3. The system of claim 1, further comprising an electrically controlled actuator operatively connected to the selector valve configured to move the selector valve between the first and second position.

4. The system of claim 3, wherein the electrically controlled actuator is actively controlled by an engine controller based at least in part on a state of the engine.

5. The system of claim 3, wherein the hydraulic rotation unit further comprises a shaft mechanically connected to the high pressure shaft through a gearbox.

6. The system of claim 5, wherein the hydraulic rotation unit further comprises a disconnect mechanism configured to disconnect the shaft from the high pressure shaft when the selector valve is in the first position.

7. The system of claim 3, further comprising, a fuel metering system disposed in the first fuel line branch downstream of the selector valve configured to meter fuel in the first fuel line branch upstream of the combustor.

8. The system of claim 7, further comprising a fuel-oil manifold disposed in the first fuel line branch downstream of the selector valve and upstream of the combustor configured to supply fuel to the combustor.

9. The system of claim 8, wherein further comprising a recirculating fuel line fluidly connecting the fuel-oil manifold and the electrically driven fuel pump such that the electrically driven fuel pump is supplied at least in part by the fuel-oil manifold.

10. The system of claim 9, wherein the electrically controlled actuator is actively controlled by an engine controller, wherein the engine controller is configured to control the electrically controlled actuator to move the selector valve between the first position and the second position based on a flight phase of an aircraft having the engine.

11. The system of claim 10, further comprising the aircraft having the engine, wherein the controller is configured to control the actuator to place the selector valve in the first position during one or more of, take off, cruise, and/or descent, and wherein the controller is configured to control the actuator to place the selector valve in the second position when the aircraft is on-ground after landing and after taxi.

12. The system of claim 11, wherein the first speed is faster than the second speed.

* * * * *